US011946631B2

(12) United States Patent
Xu et al.

(10) Patent No.: US 11,946,631 B2
(45) Date of Patent: Apr. 2, 2024

(54) LED LAMP WITH HEAT SINK AND WITH POWER SUPPLY RECEIVED IN HOUSING

(71) Applicant: SHENZHEN SNC OPTO ELECTRONIC CO., LTD, Shenzhen (CN)

(72) Inventors: Jianyong Xu, Shenzhen (CN); Nianhua Pan, Shenzhen (CN); Jianjun Xu, Shenzhen (CN); Xingrao Wu, Shenzhen (CN); Hongxiang Fu, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/202,313

(22) Filed: May 26, 2023

(65) Prior Publication Data

US 2024/0060635 A1 Feb. 22, 2024

(30) Foreign Application Priority Data

Aug. 16, 2022 (CN) ............................ 202210983518

(51) Int. Cl.
*F21V 29/83* (2015.01)
*F21K 9/232* (2016.01)
(Continued)

(52) U.S. Cl.
CPC .............. *F21V 29/83* (2015.01); *F21K 9/232* (2016.08); *F21V 17/18* (2013.01); (Continued)

(58) Field of Classification Search
CPC ...... F21V 29/83; F21V 19/0035; F21V 17/18; F21K 9/232; F21K 9/235
See application file for complete search history.

(56) References Cited

U.S. PATENT DOCUMENTS

2007/0109763 A1* 5/2007 Wolf ...................... H05B 47/12 362/276
2009/0116233 A1* 5/2009 Zheng ..................... F21K 9/232 362/234

(Continued)

FOREIGN PATENT DOCUMENTS

CN 106352258 A * 1/2017 ............ F21V 19/001
KR 20120018106 A * 2/2012

OTHER PUBLICATIONS

Machine translation of KR-20120018106-A, retrieved from worldwide.espacenet.com on Aug. 7, 2023 (Year: 2023).*

(Continued)

*Primary Examiner* — Jia X Pan
*Assistant Examiner* — Steven Y Horikoshi

(57) ABSTRACT

The present disclosure providing an LED lamp with a heat sink and with a power supply received in a housing, includes the housing, a body, the power supply received in the housing, and a first connecting member arranged between the housing and the body. The body includes the heat sink, and a plurality of first LED plates installed on the heat sink and electrically connected to the power supply; the first connecting member including an upper portion clamped with the housing, and a lower portion fixed with the heat sink. The present disclosure provides the first connecting member to separate the power supply from the heat sink and increase a distance between the power supply and the heat sink to reduce heat transferred from the first LED plates to the power supply; the first connecting member is clamped with the housing, which is convenient for assembling the LED lamp.

16 Claims, 10 Drawing Sheets

(51) Int. Cl.

| | |
|---|---|
| ***F21V 17/18*** | (2006.01) |
| ***F21V 19/00*** | (2006.01) |
| ***F21V 23/00*** | (2015.01) |
| ***F21V 23/04*** | (2006.01) |

(52) U.S. Cl.
CPC ........ *F21V 19/0035* (2013.01); *F21V 23/006* (2013.01); *F21V 23/0471* (2013.01)

(56) References Cited

U.S. PATENT DOCUMENTS

| | | | | |
|---|---|---|---|---|
| 2012/0236563 | A1* | 9/2012 | Breidenassel | F21V 17/14 362/249.02 |
| 2015/0009679 | A1* | 1/2015 | Seki | F21V 13/04 362/307 |
| 2017/0234519 | A1* | 8/2017 | Yeung | F21V 29/70 362/84 |
| 2017/0268765 | A1* | 9/2017 | Luo | F21V 29/74 |
| 2019/0032860 | A1* | 1/2019 | Wen | F21K 9/232 |
| 2019/0120474 | A1* | 4/2019 | Cheng | F21K 9/232 |
| 2020/0072452 | A1* | 3/2020 | Wan | F21V 5/045 |
| 2020/0088396 | A1* | 3/2020 | Duan | F21V 17/104 |

OTHER PUBLICATIONS

Machine translation of CN-106352258-A, retrieved from worldwide.espacenet.com on Aug. 7, 2023 (Year: 2023).*

* cited by examiner

LED LAMP WITH HEAT SINK AND WITH POWER SUPPLY RECEIVED IN HOUSING

CROSS-REFERENCE TO RELATED APPLICATION

This application claims priority to Chinese Patent Application No. 202210983518.6, entitled "LED LAMP" and filed on Aug. 16, 2022, the content of which is hereby incorporated by reference in its entirety.

BACKGROUND

Technical Field

The present disclosure generally relates to the field of lighting technologies, and especially relates to an LED lamp with a heat sink and with a power supply received in a housing.

Description of Related Art

LED lamps have advantages of energy conservation, a long lifespan, and high light efficiency that are widely used on the market. An LED corn lamp, as one kind of LED lamp, has advantages of having a large luminous surface and a high brightness, so as to be widely used in factories, workshops, warehouses, and other places.

A conventional LED corn lamp that has been used on the market usually includes a housing, a light emitting portion fixedly connected to the housing and a power supply arranged inside the housing, the light emitting portion is directly connected to the housing, to form the entire LED corn lamp thereof. The power supply is usually damaged causing to failure work of the conventional LED corn lamp. In the event of a malfunction, the light emitting portion needs to be removed in order to remove the power supply, however, the light emitting portion and the housing are fixed with each other by screws, which inconveniently disassemblies the light emitting portion from the housing. And there are no other components arranged between the power supply and the light emitting portion on the market, and the light emitting portion includes a heat sink and an LED plate; when the LED corn lamp works, the LED plate emits a huge amount of heat, because the power supply is arranged close to the light emitting portion, the heat emitted by the LED plate is directly transmitted to the power supply, to affect a lifespan and normal operation of the power supply.

Therefore, the present disclosure provides a connecting member which is conveniently assembled between a housing and a body of the LED lamp, so as to reduce heat transferred from LED plates to the power supply of the LED lamp.

SUMMARY

The technical problems to be solved: in view of the shortcomings of the related art, the present disclosure provides an LED lamp with a heat sink and with a power supply received in a housing which can ensure a convenient assembly of the LED lamp by providing a connecting member arranged between a housing and a body of the LED lamp, so as to reduce heat transferred from LED plates to a power supply of the LED lamp.

An LED lamp with a heat sink and with a power supply received in a housing according to an embodiment of the present disclosure includes: the housing, a body, the power supply received in the housing, and a first connecting member arranged between the housing and the body; the body includes the heat sink, and a plurality of first LED plates installed on the heat sink and electrically connected to the power supply; the first connecting member including an upper portion clamped with the housing, and a lower portion fixed with the heat sink.

The present disclosure provides the advantages as below: the present disclosure provides the first connecting member arranged between the housing and the body to separate the power supply from the heat sink, and to reduce heat transferred from the plurality of first LED plates to the power supply, thereby normally operating the power supply and increasing a lifespan of the power supply; furthermore, the first connecting member is clamped with the housing, which is convenient for assembling the LED lamp.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

The element labels according to the embodiments of the present disclosure are as below:

housing, 11 opening, 12 inner wall, 13 clamping plate, **13*a* second clamping portion, 131 protrusion, 132 reinforcing rib, 14 positioning groove, 20 body, 21 heat sink, 211 hollow tube, 2111 top opening, 2112 bottom opening, 212 mounting plate, 213 ventilation gap, 22 first LED plate, 23 first light mask, 30 power supply, 40 first connecting member, 41 upper portion, 42 lower portion, 43 flange, 43*a* first clamping portion, 431 first wall, 432 second wall, 433 receiving slot, 434 mouth, 435 third wall, 44 receiving chamber, 45 installation portion, 46 circumferential surface, 47 cavity, 471 side surface, 472 convective orifice, 48 limiting edge, 50 second connecting member, 51 convective groove, 52 line passage, 60 base, 61 installation opening, 62 circuit board, 70 second LED plate, 71 second light mask, 80 sensor, 90 switch member, 91** holder.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

It should also be further understood that the term "and/or" used in the description of the present disclosure and the appended claims refers to any combination of one or more of associated listed items and all possible combinations, and includes these combinations.

Figure 1:
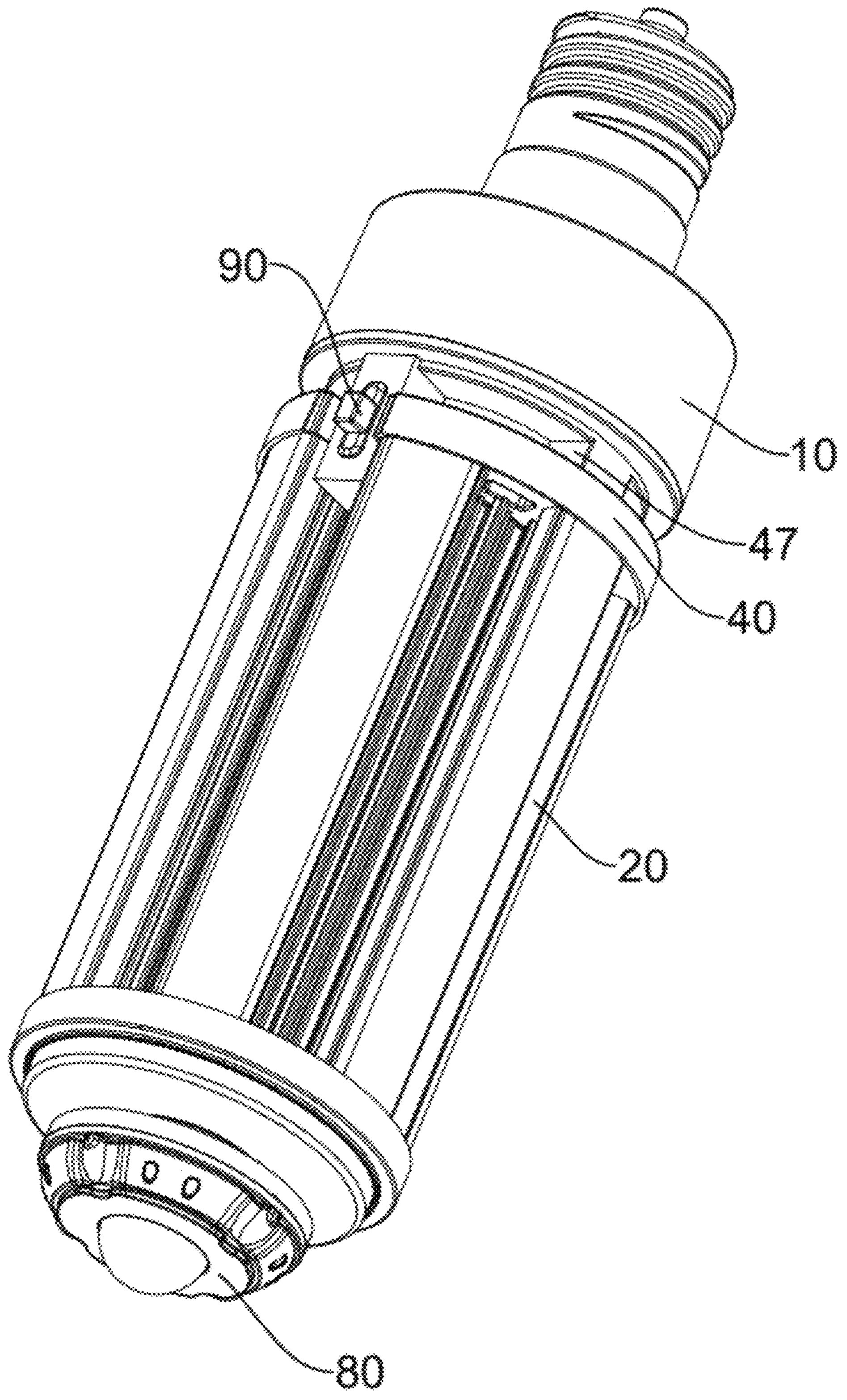
FIG. 1 is a schematic view of an LED lamp with a heat sink and with a power supply received in a housing in accordance with an embodiment of the present disclosure.
Figure 2:
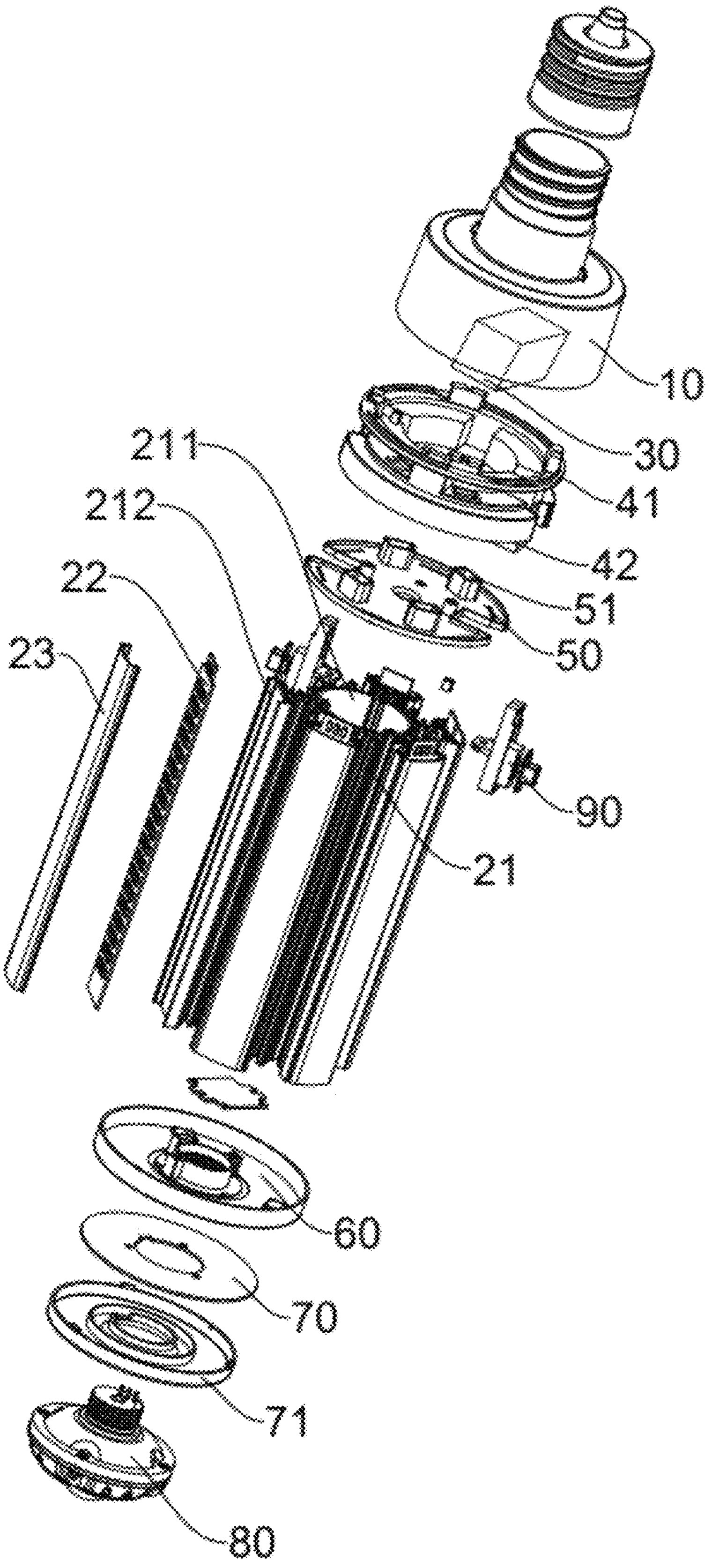
FIG. 2 is an exploded, schematic view of the LED lamp of FIG. 1.
Figure 3:
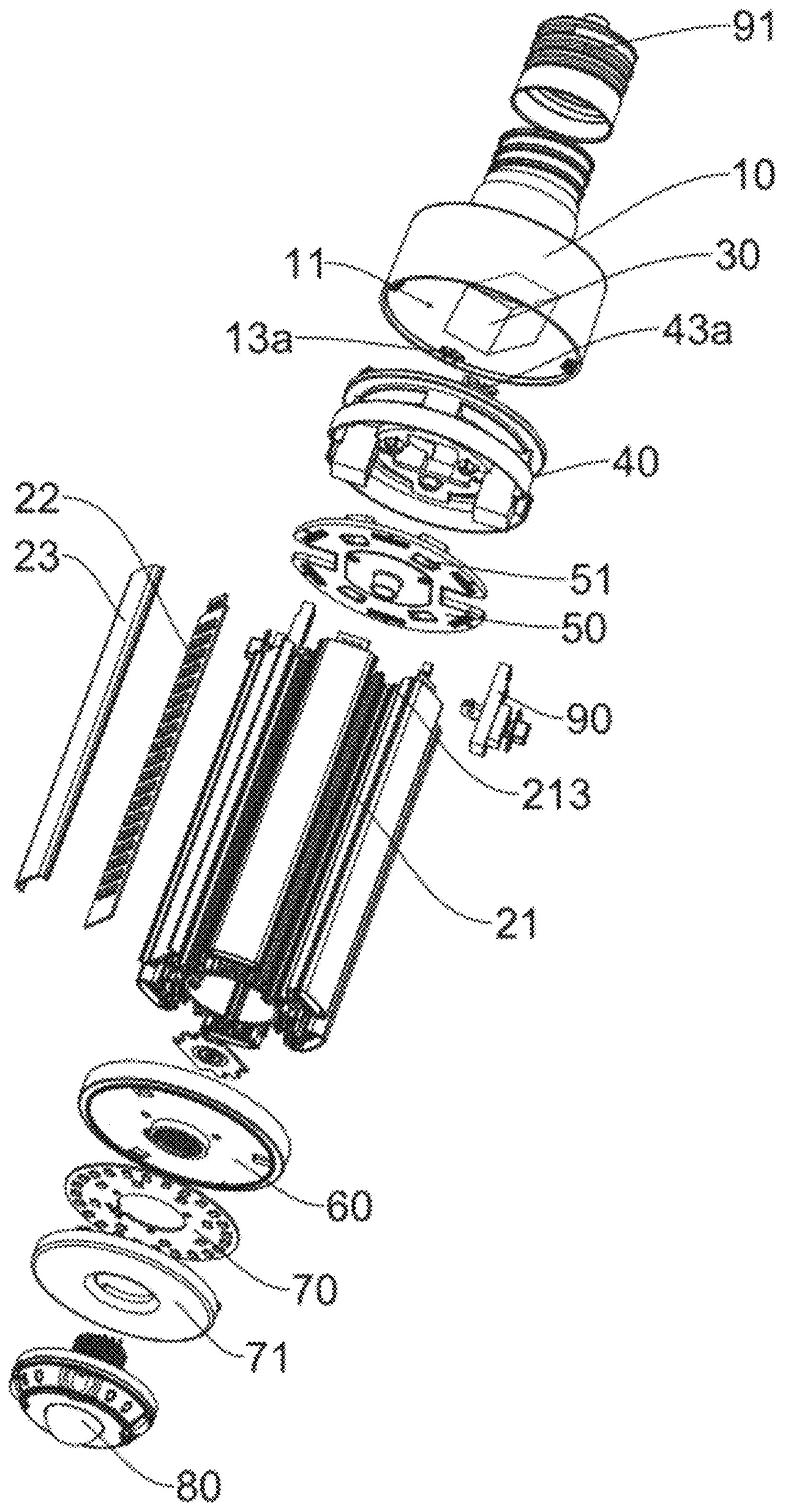
FIG. 3 is similar to FIG. 2, but shown from another view.
Figure 4:
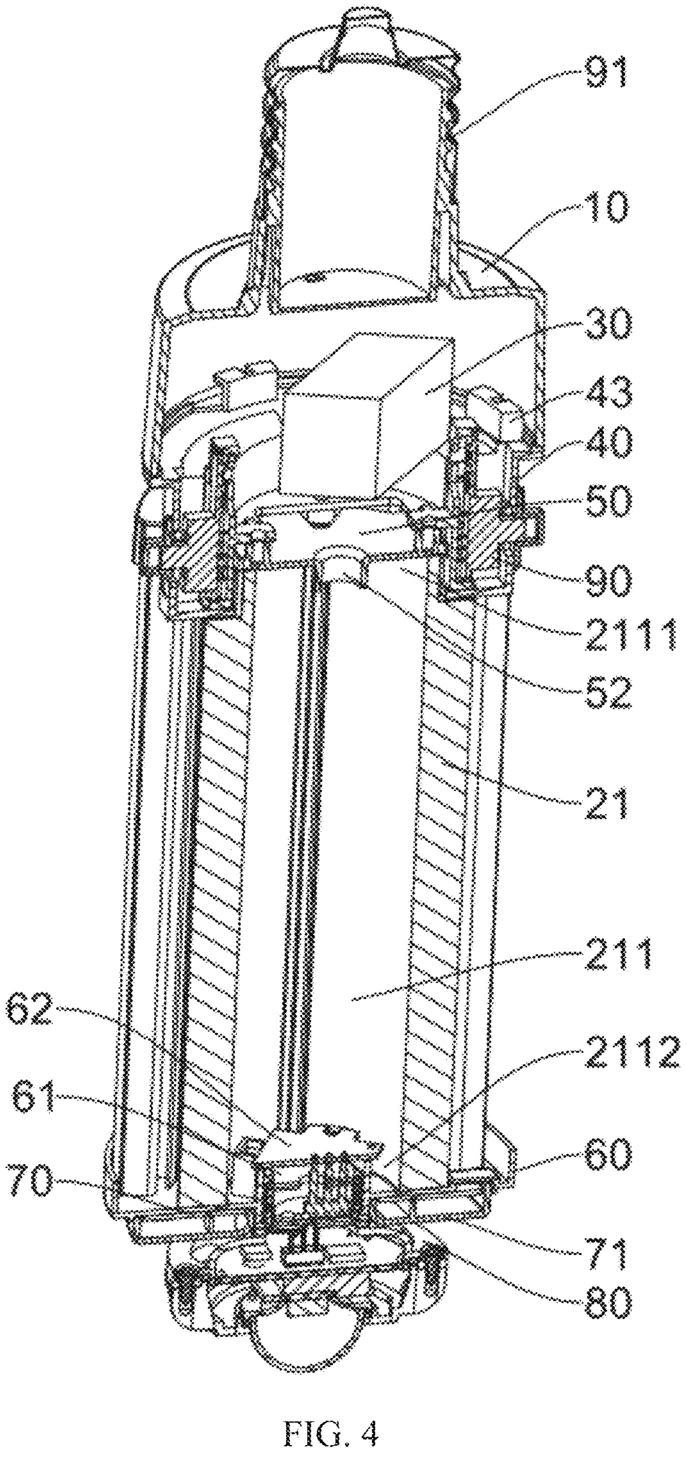
FIG. 4 is a cross-sectional view of the LED lamp of FIG. 1.
Figure 5:
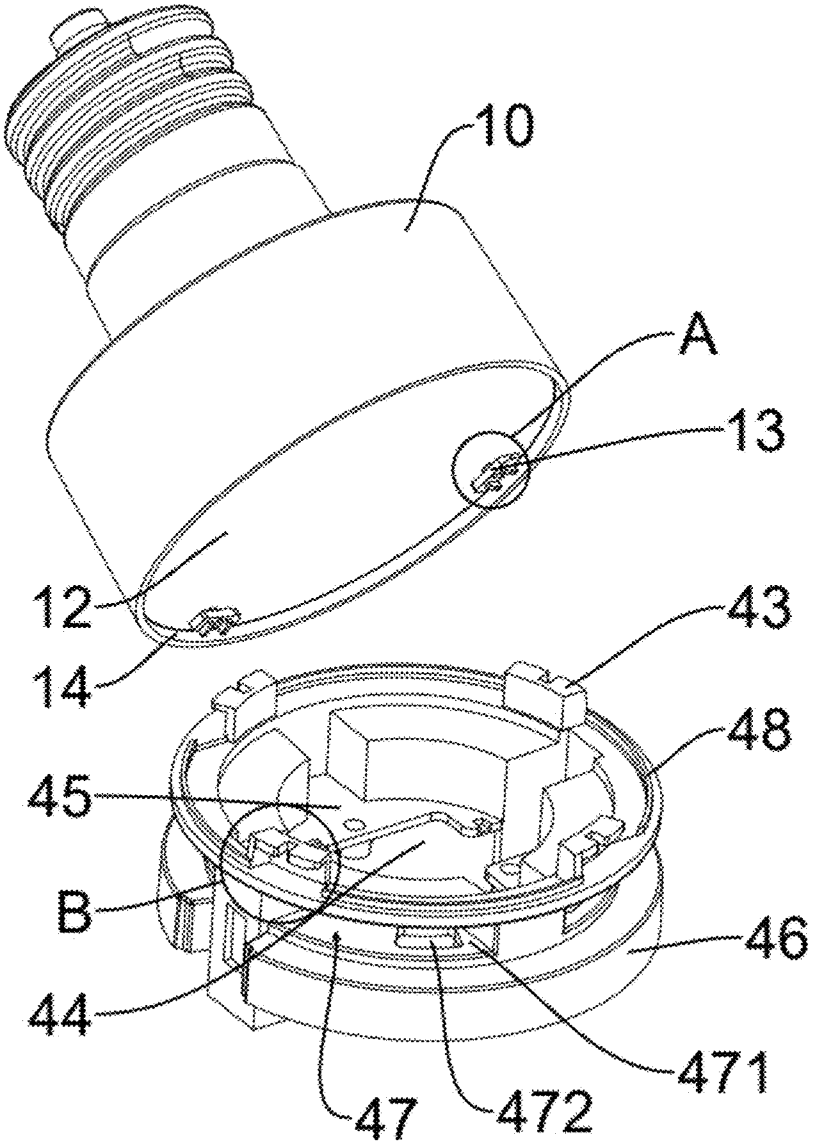
FIG. 5 is a schematic view of the housing and a first connecting member of the LED lamp of FIG. 1.
Figure 6:
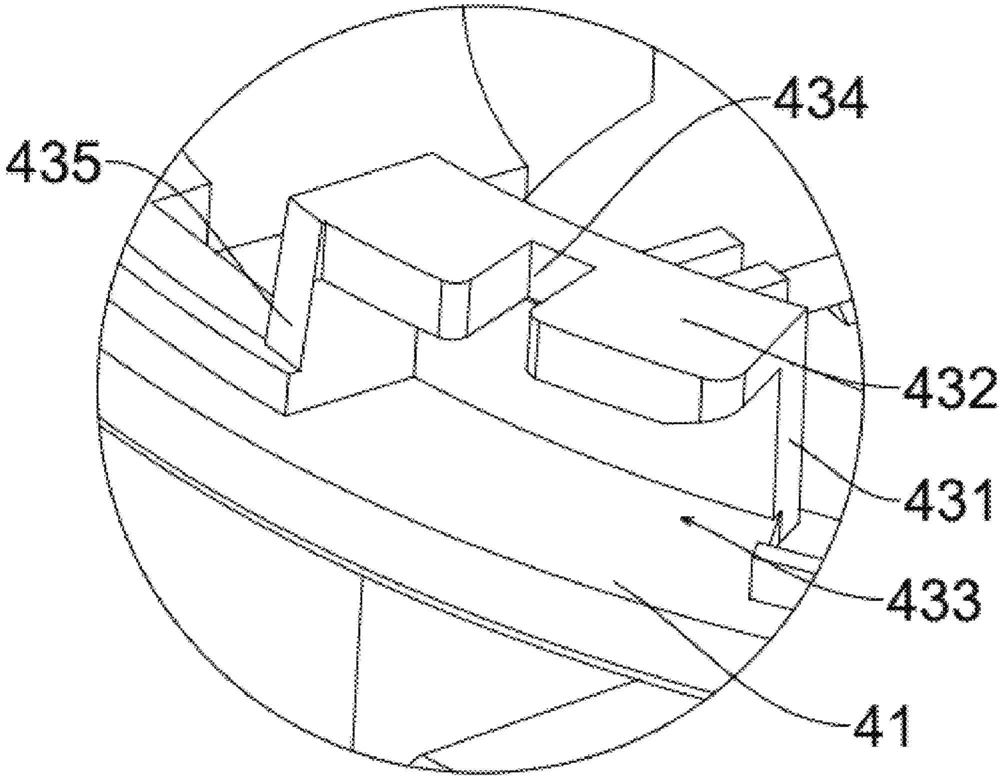
FIG. 6 is a partial enlarged view of a circle B of the LED lamp of FIG.
Figure 7:
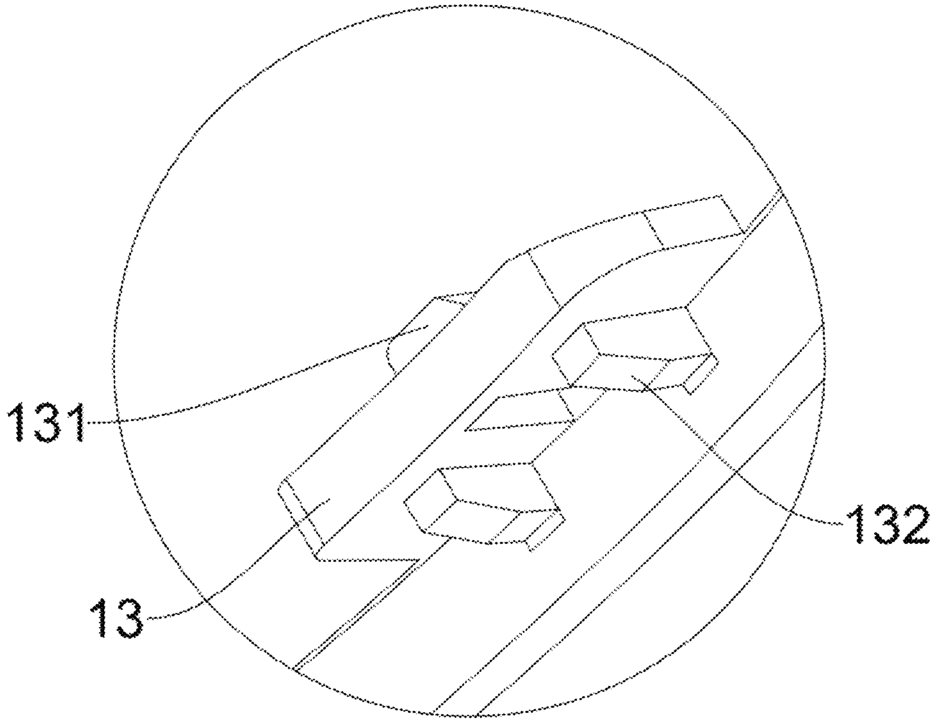
FIG. 7 is a partial enlarged view of a circle A of the LED lamp of FIG. 5.
Figure 8:
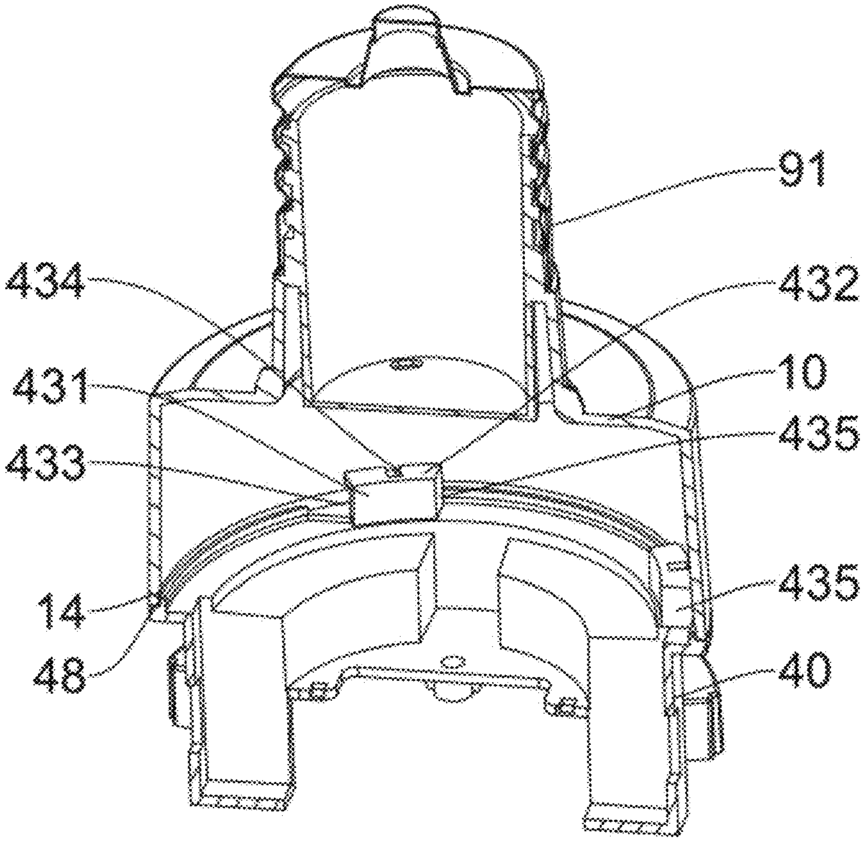
FIG. 8 is a partial cross-sectional view of the LED lamp of FIG. 1.
Figure 9:
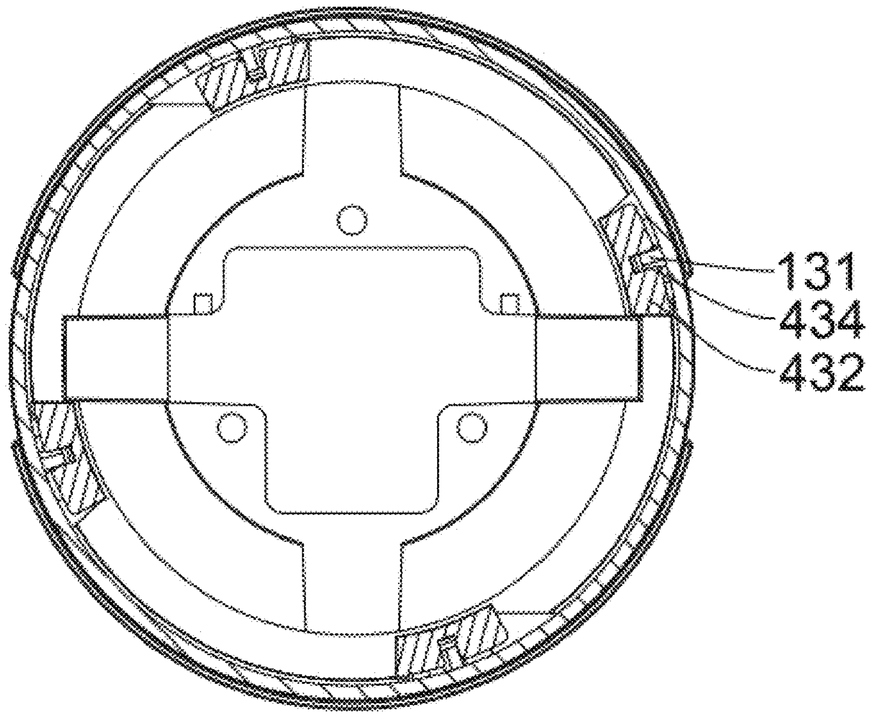
FIG. 9 is similar to FIG. 8, but shown from another view.
Figure 10:
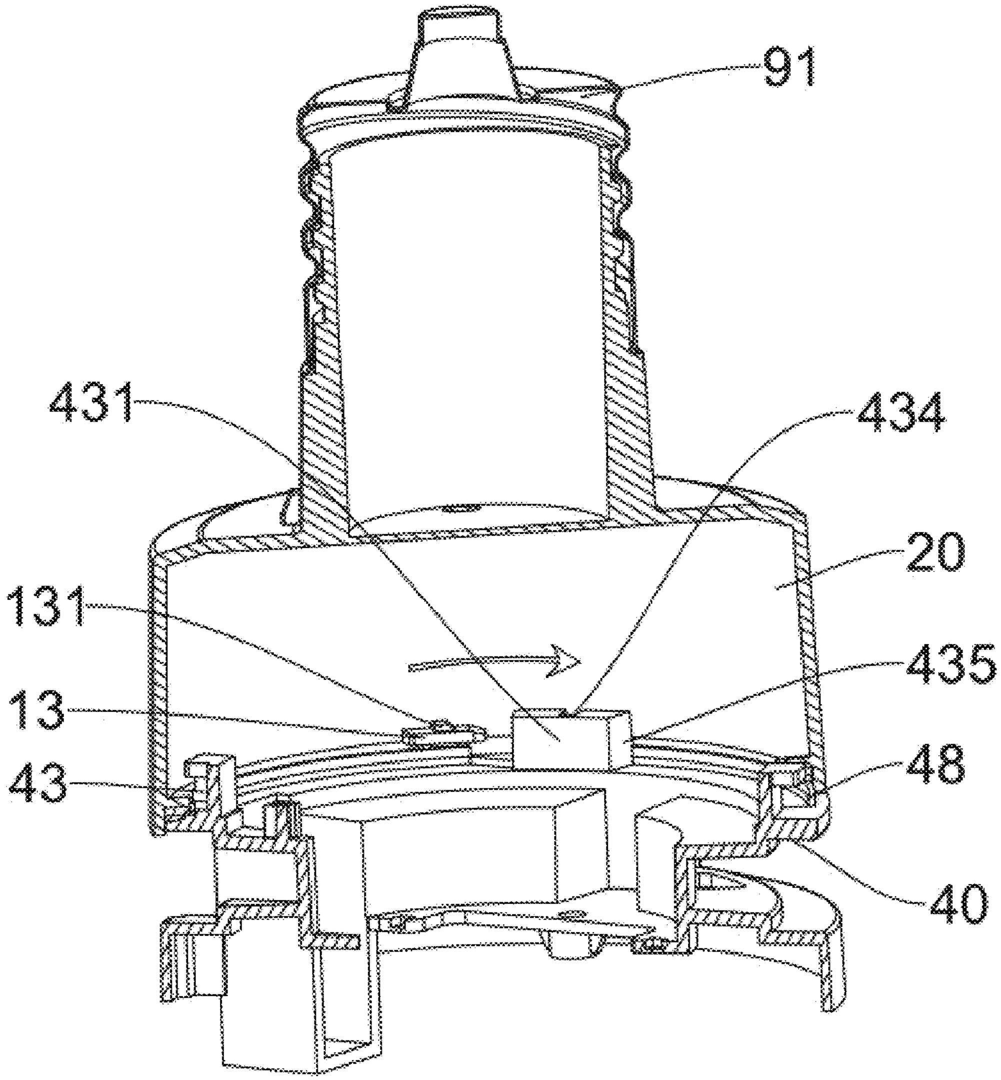
FIG. 10 is a cross-sectional view of the housing and the first connecting member of the LED lamp of FIG. 1, shown before the housing and the first connecting member are rotated and clamped with each other.
Figure 11:
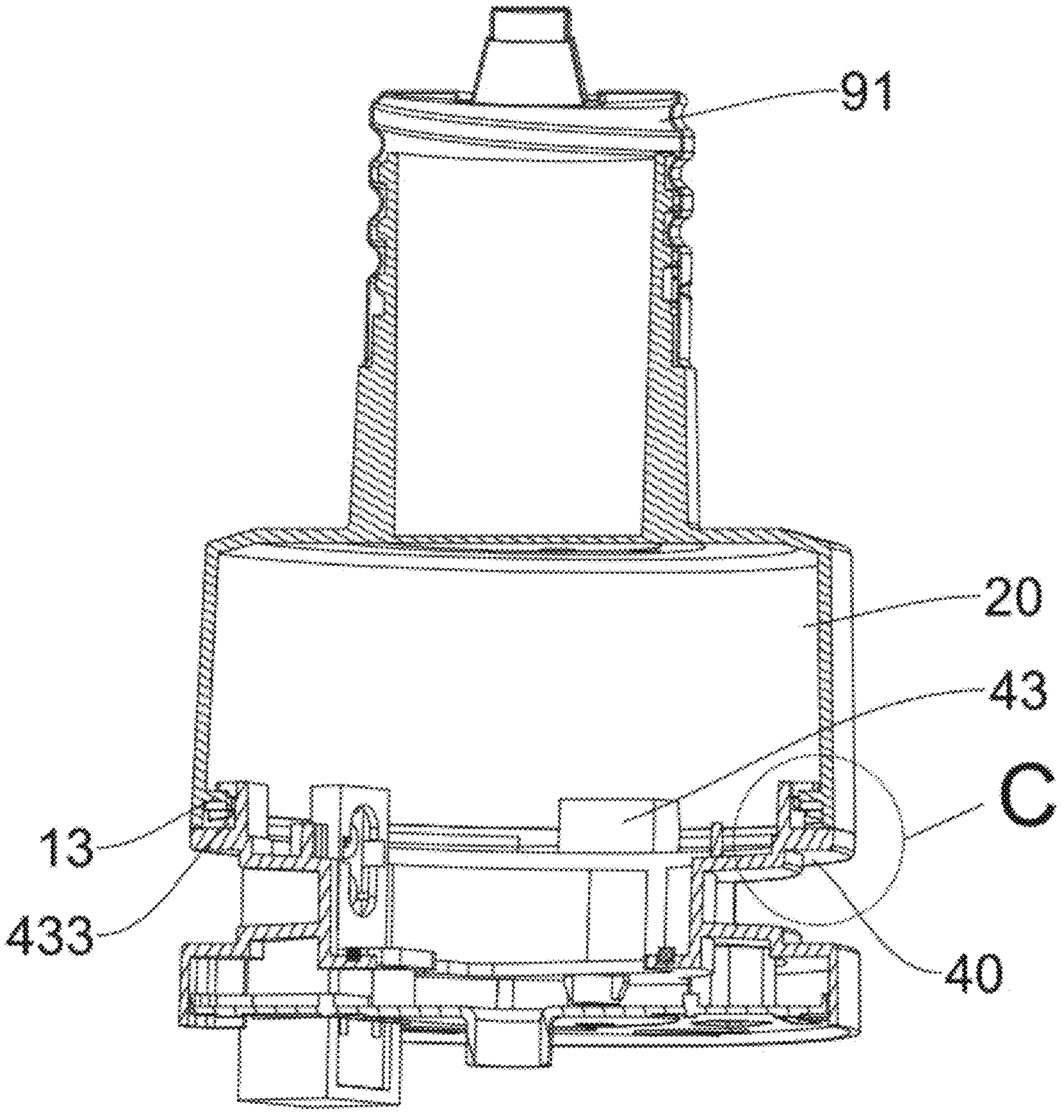
FIG. 11 is similar to FIG. 10, but shown after the housing and the first connecting member are rotated and clamped with each other.
Figure 12:
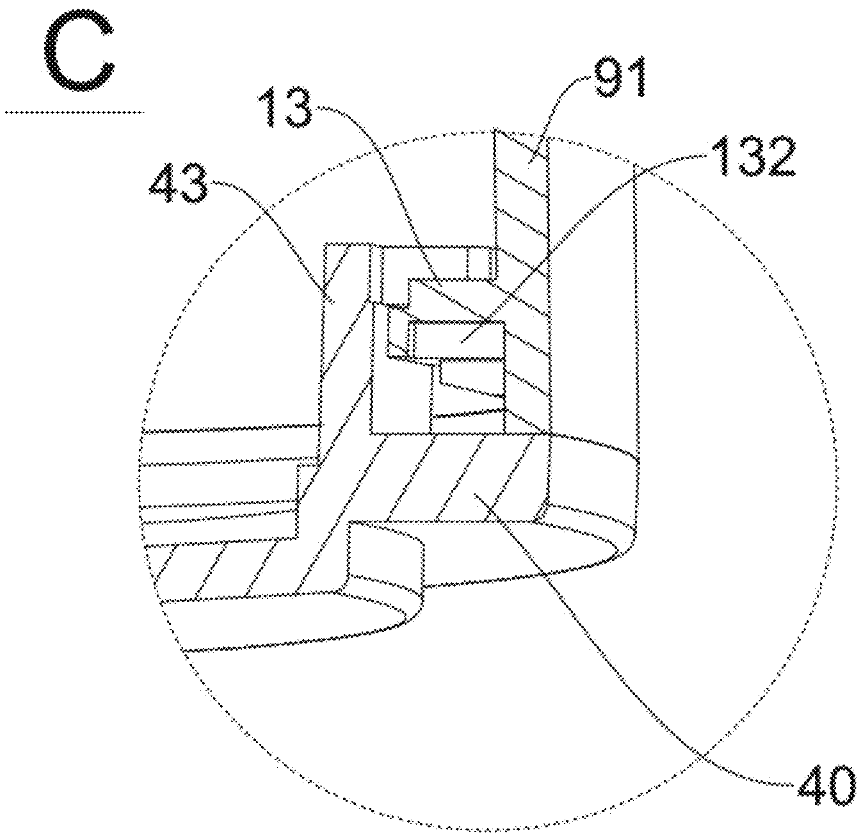
FIG. 12 is a partial enlarged view of a circle C of the LED lamp of FIG. 11.

Referring to FIGS. 1-12, an LED lamp with a heat sink and with a power supply received in a housing in accordance with an embodiment of the present disclosure includes the housing 10 arranged on a top end of the LED lamp, a body 20 arranged on a bottom end of the LED lamp, the power supply 30 received in the housing 10, and a first connecting member 40 connected between the body 20 and the power supply 30. In an embodiment of the present disclosure, both the housing 10 and the first connecting member 40 are cylindrical. The body 20 includes the heat sink 21, and a plurality of first LED plates 22 installed on the heat sink 21 and electrically connected to the power supply 30. The first connecting member 40 includes an upper portion 41 clamped with the housing 10, and a lower portion 42 opposite to the upper portion 41 and fixed with the heat sink 21 of the body 20.

The present disclosure provides the first connecting member 40 arranged between the housing 10 and the heat sink 21 of the body 20, to separate the power supply 30 from the heat sink 21 by the first connecting member 40, to increase a distance between the heat sink 21 and the power supply 30, to reduce heat transferred from the plurality of first LED plates 22 to the power supply 30, to ensure normal operation of the power supply 30, and to increase a lifespan of the power supply 30. At the same time, the first connecting member 40 is connected to the housing 10 through a clamping mode, which is convenient for assembling the LED lamp.

During assembling the LED lamp, the plurality of first LED plates 22 is first installed on the heat sink 21 to form the body 20, and then, the lower portion 42 of the first connecting member 40 is fixed with the body 20, to connect the first connecting member 40 with the body 20 as a whole. Finally, the upper portion 41 of the first connecting member 40 is clamped with the housing 10 to complete an assembly of the LED lamp. The first connecting member 40 and the body 20 can be fixed with each other by screws.

A plurality of first clamping portions **43*a* is arranged on the upper portion 41 of the first connecting member 40 along a circumferential direction of the first connecting member 40, and a plurality of second clamping portions 13*a* is arranged on the housing 10 along a circumferential direction of the housing 10 and correspondingly clamped with the plurality of first clamping portions 43*a*, to connect the housing 10 and the first connecting member 40**.

In some embodiments of the present disclosure, the plurality of first clamping portions **43*a* is flanges 43, and the plurality of second clamping portions 13*a* is clamping plates 13. Specifically, an opening 11 is arranged on an end of the housing 10 facing the first connecting member 40, and the plurality of clamping plates 13 is arranged on an inner wall 12 of the housing 10 close to the opening 11, and uniformly distributed along a circumferential direction of the inner wall 12 and corresponding to the plurality of flanges 43. The plurality of flanges 43 is arranged along the circumferential direction of the inner wall 12, and the plurality of clamping plates 13 is also arranged along the circumferential direction of the inner wall 12. After the housing 10 is assembled to the first connecting member 40, each of the plurality of flanges 43 is correspondingly interlocked with the plurality of clamping plates 13 to connect the housing 10 and the first connecting member 40**.

In an embodiment of the present disclosure, the first connecting member 40 is a cylindrical piece and includes a receiving chamber 44 and a plurality of installation portions 45 received in the receiving chamber 44; the first connecting member 40 and the heat sink 21 are fixed with each other by screws passing through the plurality of installation portions 45 and the heat sink 21.

In an optical embodiment of the present disclosure, each of the plurality of flanges 43 includes a first wall 431 set in a vertical direction thereof, and a second wall 432 perpendicular to the first wall 431 and set in a horizontal direction thereof; two opposite ends of the first wall 431 respectively connected to the upper portion 41 of the first connecting member 40 and the second wall 432, the second wall 432 arranged parallel to an end surface of the upper portion 41, and a receiving slot 433 formed between the second wall 432 and the upper portion 41 of the first connecting member 40. A mouth 434 is formed on the second wall 432, a protrusion 131 formed on the clamping plate 13 and corresponding to the mouth 434, the clamping plate 13 installed in the receiving slot 433, and the protrusion 131 inserted into the mouth 434. During installing the connecting member 40 and the body 20, the first connecting member 40 rotates to clip the clamping plate 13 into the receiving slot 433, and the protrusion 131 of the clamping plate 13 is clipped into the mouth 434 of the second wall 432. In some embodiments of the present disclosure, a chamfer is formed at an end of the protrusion 131 to guide the protrusion 131 to be more conveniently inserted into the mouth 434. In some embodiments of the present disclosure, a plurality of reinforcing ribs 132 extends downwardly from a lower surface of the clamping plate 13, and is perpendicularly connected to the clamping plate 13. The plurality of reinforcing ribs 132 is arranged on both sides of the protrusion 131, in this way, mechanical strength of the clamping plate 13 can be ensured by setting the plurality of reinforcing ribs 132, so as to further ensure fixation stability between the housing 10 and the first connecting member 40.

In an optical embodiment of the present disclosure, the flange 43 also includes a third wall 435 arranged between the second wall 432 and the upper portion 41 and perpendicular to both the first wall 431 and the second wall 432. The third wall 435 is provided to play a limiting role, so as to double position the first connecting member 40 through the protrusion 131 and the third wall 435, resulting in obtaining a better positioning effect thereof.

In some embodiments of the present disclosure, the upper portion 41 of the first connecting member 40 includes a limiting edge 48 staggered with the flange 43, and a positioning groove 14 arranged on an inner wall of the housing 10 for receiving the limiting edge 48 therein. During installation, by setting the limiting edge 48, when assembling the first connecting member 40 and the housing the limiting edge 48 of the first connecting member 40 is first inserted into the opening 11 of the housing 10, and then the housing 10 rotates to clamp the clamping plate 13 of the housing 10 into the flange 43 of the first connecting member 40, so as to assemble the housing 10 and the first connecting member 40 together; the limiting edge 48 is clipped into the positioning groove 14, which can also obtain a good sealing effect thereof.

In an optical embodiment of the present disclosure, the LED lamp further includes a disc-shaped second connecting member 50 arranged between the first connecting member 40 and the heat sink 21. All the first connecting member the second connecting member 50 and the heat sink 21 are fixed together by screws passing through the first connecting member 40, the second connecting member 50 and the heat sink 21.

The heat sink 21 includes a cylindrical hollow tube 211 and a plurality of mounting plates 212 connected to a circumferential side of the hollow tube 211 and uniformly arranged around an axis of the hollow tube 211, a ventilation gap 213 formed between each two adjacent mounting plates 212, and the plurality of first LED plates 22 installed on the plurality of mounting plates 212 correspondingly. The plurality of first LED plates 22 emits light along the circumferential direction of the heat sink 21 for illumination.

A plurality of cavities 47 is arranged on a circumferential surface 46 of the first connecting member 40, a convective orifice 472 formed at a side surface 471 of the plurality of cavities 47 close to the heat sink 21, a convection groove 51 arranged on the second connecting member 50 and corresponding to the convective orifice 472; the ventilation gap 213 is directly opposite to the convection groove 51 and connected to the plurality of cavities 47 by the convection groove 51. The conventional corn lamp mainly relies on surfaces of the heat sink 21 for heat radiation, but the heat transmission effect is poor. The present disclosure provides a convective heat dissipation mode that a convection channel is composed by the ventilation gap 213, the convection groove 51 and the convective orifice 472. In this way, air flows from the ventilation gap 213 to the convection groove 51, and then flows outwardly through the convective orifice 472 of the first connecting member 40, result in increasing a heat dissipation path to obtain a good heat dissipation effect thereof.

In an optical embodiment of the present disclosure, the LED lamp further includes a base 60 installed on an end of the heat sink 21 away from the housing 10, and a second LED plate 70 installed below the base 60, and a sensor 80. The plurality of first LED plates 22 is configured to illuminate surrounding areas, while the second LED plate 70 is configured to illuminate a lower part of the LED lamp, result in increasing an illumination range of the LED lamp. The base 60 includes an installation opening 61, and the sensor 80 installed in the installation opening 61 and electrically connected to the power supply 30. The sensor 80 can be selected from a microwave sensor, an infrared sensor and other sensors. The sensor 80 is configured to sense whether a human body has passed by, and if a human body has passed by, the sensor 80 controls the LED lamp to be turned on. Other sensors can be ambient light sensors to control the LED lamp to be turned on or turned off based on brightness of environments. For example, when the day turns dark, the ambient light sensor controls the LED lamp to be turned on.

It should be noted that the LED lamp of the present disclosure can also include a first light mask 23 covering on the plurality of first LED plates 22, and a second light mask 71 covering on the second LED plate 70.

In an optical embodiment of the present disclosure, the LED lamp further includes a switch member 90 arranged on the first connecting member 40 and electrically connected to the power supply 30. The switch member 90 can be a toggle-type switch or a button-type switch. The switch member 90 is configured to switch a color temperature of the LED lamp, LED beads within the LED lamp include cold temperature LED beads and warm temperature LED beads, the switch member 90 is configured to switch between the cold temperature LED beads and the warm temperature LED beads, so as to only lighting up the cold temperature LED beads, or only lighting up the warm temperature LED beads, or simultaneously lighting up both the cold temperature LED beads and the warm temperature LED beads, to mix cold colors and warm colors, or obtain three color temperatures thereof.

In an embodiment of the present disclosure, the hollow tube 211 includes a top opening 2111 and a bottom opening 2112, and a line passage 52 is arranged in the middle of the second connecting member 50. The second connecting member 50 completely covers on the top opening 2111 of the hollow tube 211, and the line passage 52 is connected to the top opening 2111. The base is connected with a bottom end of the heat sink 21, and the second LED plate 70 is installed on the base 60. The installation opening 61 is formed at the middle of the base 60, a circuit board 62 covers on a top end of the installation opening 61, and the sensor 80 is connected to the installation opening 61. The switch member is arranged on a peripheral wall of the first connecting member 40. The holder 91 is connected to the end of the housing 10 far from the body 20, so that the confined space is formed by the holder 91, the housing 10, the first connecting member 40, the second connecting member 50, the hollow tube 211, the base 60 and the sensor 80. By adopting a sealed design of the present disclosure, good dust prevention effect can be obtained to prevent dust from entering the interior of the body 20, resulting in affecting performances and the lifespan of the power supply or other electronic devices within the LED lamp.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED lamp with a heat sink and with a power supply received in a housing, comprising the housing, a body, the power supply received in the housing, and a first connecting member arranged between the housing and the body; and wherein the body comprises the heat sink, and a plurality of first LED plates installed on the heat sink and electrically connected to the power supply; the first connecting member comprising an upper portion clamped with the housing, and a lower portion fixed with the heat sink; and wherein the heat sink comprises a hollow tube and a plurality of mounting plates uniformly arranged around an axis of the hollow tube, a ventilation gap formed between each two adjacent mounting plates, the plurality of first LED plates installed on the plurality of mounting plates correspondingly; and wherein the LED lamp further comprises a second connecting member arranged between the first connecting member and the heat sink; and wherein a plurality of cavities is arranged on a circumferential surface of the first connecting member, a convective orifice formed at a side surface of the plurality of cavities close to the heat sink; a convection groove arranged on the second connecting member and corresponding to the convection orifice, and the ventilation gap connected to the plurality of cavities by the convection groove.

2. The LED lamp as claimed in claim 1, wherein a plurality of first clamping portions is arranged on the upper portion along a circumferential direction of the upper portion, and a plurality of second clamping portions is arranged on the housing along a circumferential direction of the housing and correspondingly clamped with the plurality of first clamping portions, to connect the housing and the first connecting member.

3. The LED lamp as claimed in claim 2, wherein the plurality of first clamping portions is flanges, and the plurality of second clamping portions is clamping plates.

4. The LED lamp as claimed in claim 3, wherein the first connecting member is a cylindrical piece and comprises a receiving chamber and a plurality of installation portions received in the receiving chamber, the connecting member and the heat sink fixed with each other by screws passing through the plurality of installation portions and the heat sink.

5. The LED lamp as claimed in claim 3, wherein each of the plurality of flanges comprises a first wall and a second wall, two ends of the first wall respectively connected to the upper portion of the first connecting member and the second wall, the second wall arranged parallel to the upper portion, a receiving slot formed between the second wall and the upper portion of the first connecting member, a mouth formed on the second wall, a protrusion formed on the clamping plate, the clamping plate installed in the receiving slot, and the protrusion inserted into the mouth.

6. The LED lamp as claimed in claim 5, wherein the flange further comprises a third wall arranged between the second wall and the upper portion of the first connecting member.

7. The LED lamp as claimed in claim 3, wherein the LED lamp further comprises a base installed on an end of the heat sink away from the housing, and a second LED plate installed on the base.

8. The LED lamp as claimed in claim 7, wherein the LED lamp further comprises a sensor, the base comprising an installation opening, and the sensor installed in the installation opening and electrically connected to the power supply.

9. The LED lamp as claimed in claim 8, wherein a holder is connected with an end of the housing far from the body, a confined space formed by the holder, the housing, the first connecting member, the second connecting member, the hollow tube, the base and the sensor.

10. The LED lamp as claimed in claim 1, wherein the upper portion comprises a limiting edge, and a positioning groove arranged on an inner wall of the housing for receiving the limiting edge therein.

11. The LED lamp as claimed in claim 1, wherein the LED lamp further comprises a switch member arranged on the first connecting member and electrically connected to the power supply.

12. An LED lamp with a heat sink and with a power supply received in a housing, comprising the housing, a body, the power supply received in the housing, and a first connecting member arranged between the housing and the body; and wherein the body comprises the heat sink, and a plurality of first LED plates installed on the heat sink and electrically connected to the power supply; the first connecting member comprising an upper portion clamped with the housing, and a lower portion fixed with the heat sink; and wherein a plurality of first clamping portions is arranged on the upper portion along a circumferential direction of the upper portion, and a plurality of second clamping portions is arranged on the housing along a circumferential direction of the housing and correspondingly clamped with the plurality of first clamping portions, to connect the housing and the first connecting member; and wherein the plurality of first clamping portions is flanges, and the plurality of second clamping portions is clamping plates; and wherein the heat sink comprises a hollow tube and a plurality of mounting plates uniformly arranged around an axis of the hollow tube, a ventilation gap formed between each two adjacent mounting plates, the plurality of first LED plates installed on the plurality of mounting plates correspondingly; and wherein the LED lamp further comprises a second connecting member arranged between the first connecting member and the heat sink; and wherein a plurality of cavities is arranged on a circumferential surface of the first connecting member, a convective orifice formed at a side surface of the plurality of cavities close to the heat sink; a convection groove arranged on the second connecting member and corresponding to the convection orifice, and the ventilation gap connected to the plurality of cavities by the convection groove.

13. The LED lamp as claimed in claim 12, wherein the first connecting member is a cylindrical piece and comprises a receiving chamber and a plurality of installation portions received in the receiving chamber, the connecting member and the heat sink fixed with each other by screws passing through the plurality of installation portions and the heat sink.

14. The LED lamp as claimed in claim 12, wherein each of the plurality of flanges comprises a first wall and a second wall, two ends of the first wall respectively connected to the upper portion of the first connecting member and the second wall, the second wall arranged parallel to the upper portion, a receiving slot formed between the second wall and the upper portion of the first connecting member, a mouth formed on the second wall, a protrusion formed on the clamping plate, the clamping plate installed in the receiving slot, and the protrusion inserted into the mouth; and wherein the flange further comprises a third wall arranged between the second wall and the upper portion of the first connecting member.

15. The LED lamp as claimed in claim 12, wherein the upper portion comprises a limiting edge, and a positioning groove arranged on an inner wall of the housing for receiving the limiting edge therein.

16. The LED lamp as claimed in claim 12, wherein the LED lamp further comprises a base installed on an end of the heat sink away from the housing, a second LED plate installed on the base, a sensor, and a switch member arranged on the first connecting member and electrically connected to the power supply, the base comprising an installation opening, and the sensor installed in the installation opening and electrically connected to the power supply; and wherein a holder is connected with an end of the housing far from the body, a confined space formed by the holder, the housing, the first connecting member, the second connecting member, the hollow tube, the base and the sensor.

* * * * *